United States Patent [19]
Oglesbee

[11] Patent Number: 5,969,515
[45] Date of Patent: Oct. 19, 1999

[54] APPARATUS AND METHOD FOR DIGITAL CONTROL OF A POWER CONVERTER CURRENT

[75] Inventor: John W. Oglesbee, Watkinsville, Ga.

[73] Assignee: Motorola, Inc., Schaumburg, Ill.

[21] Appl. No.: 09/032,602

[22] Filed: Feb. 27, 1998

[51] Int. Cl.[6] ............................. G05F 1/40; G05B 24/02
[52] U.S. Cl. ........................... 323/283; 323/285; 323/351
[58] Field of Search .................................. 323/222, 282, 323/283, 284, 285, 351

[56] References Cited

U.S. PATENT DOCUMENTS

| | | | |
|---|---|---|---|
| 5,514,947 | 5/1996 | Berg | 323/282 |
| 5,572,113 | 11/1996 | Barrett | 323/285 |
| 5,675,240 | 10/1997 | Fujisawa et al. | 323/282 |
| 5,734,259 | 3/1998 | Sisson et al. | 323/282 |
| 5,754,414 | 5/1998 | Hanington | 323/282 |
| 5,844,399 | 12/1998 | Stuart | 323/282 |
| 5,844,403 | 12/1998 | Sugimoto et al. | 323/282 |

*Primary Examiner*—Peter S. Wong
*Assistant Examiner*—Bao Q. Vu
*Attorney, Agent, or Firm*—Felipe J. Farley

[57] ABSTRACT

A digital control circuit is used for controlling the load current of a power converter circuit (102), and comprises a reference circuit (302), analog comparator circuit (304), control logic circuit (306), and a counter circuit (308). The control logic circuit controls the operation of a power switch (110), and uses counters (314, 316) in conjunction with the analog comparator circuit and reference circuit, to determine when to open and close the power switch. The load current is allowed to vary between a first and second preselected load current levels.

20 Claims, 7 Drawing Sheets

| CONDUCTION STATE | CONDUCTION INTERVAL | | | NON-CONDUCTION INTERVAL |
|---|---|---|---|---|
| | $I_1$ | $I_2$ | $I_3$ | $I_4$ |
| CONDUCTION ELEMENT | SWITCH CONDUCTS | DIODE CONDUCTS | | NO CURRENT |
| INDUCTOR CURRENT | $\phi \longrightarrow I_{PEAK}$ | $I_{PEAK} \longrightarrow \frac{I_{PEAK}}{2}$ | $\frac{I_{PEAK}}{2} \longrightarrow \phi$ | $\phi$ |
| COUNTER A | | COUNT UP | COUNT DOWN | COUNT DOWN |
| COUNTER B | $\phi$ (NO COUNT) | COUNT UP | COUNT DOWN | $\phi$ (NO COUNT) |

*FIG. 4*

APPARATUS AND METHOD FOR DIGITAL CONTROL OF A POWER CONVERTER CURRENT

TECHNICAL FIELD

The invention relates in general to power converter circuits, and more particularly to circuits and methods for digitally controlling the load current of a power converter circuit.

BACKGROUND

Conventional power converter control circuits and methods have been driven towards more precise control of output voltage and current. Achieving better precision, such as by pulse width modulation (PWM) is crucial for many power converter applications, allowing conventional switched mode power converter to be used in applications where previously only linear regulation was acceptable for control of output parameters.

However, not all applications require high degrees of precision, or high speed feedback controlled power converters. For example, in providing charge current to a battery, precise control of the charge current level is not necessary. Most types of rechargeable batteries will accept charge (unless they are already fully charged) in proportion to the charge current, and wide variations in the charge current will not harm the battery. The average current is a more important parameter than the precise level of the charge current in most cases.

Many battery charging systems currently marketed, particularly those for use with portable communications and computing equipment, utilize a microcontroller or microprocessor, in conjunction with suitable instruction code, to carry out charging regimes. Many of these same charging systems utilize PWM controlled power converters to control the charge current level, under control of the microprocessor. Typically a PWM controller integrated circuit (IC) is used, such as a TL494, which is manufactured by Motorola, Inc., among many others. However, one of the market drivers for battery chargers in consumer markets is cost. Incorporating the function of the PWM controller IC into the microprocessor would seem an ideal solution. Unfortunately, because of the speed at which a PWM control IC operates in order to effectively control power converter output parameters, the cost of a microprocessor fast enough to carry out PWM control would likely be more than the benefit of integration. Therefore, there exists a need for simple, low cost, digitally operated power converter control circuit that may be integrated with an inexpensive microprocessor.

BRIEF DESCRIPTION OF THE DRAWINGS

FIG. 4 shows a table of the states of various components of a control circuit in accordance with the invention during a cycle of operation;

DETAILED DESCRIPTION OF THE PREFERRED EMBODIMENT

Figure 1:
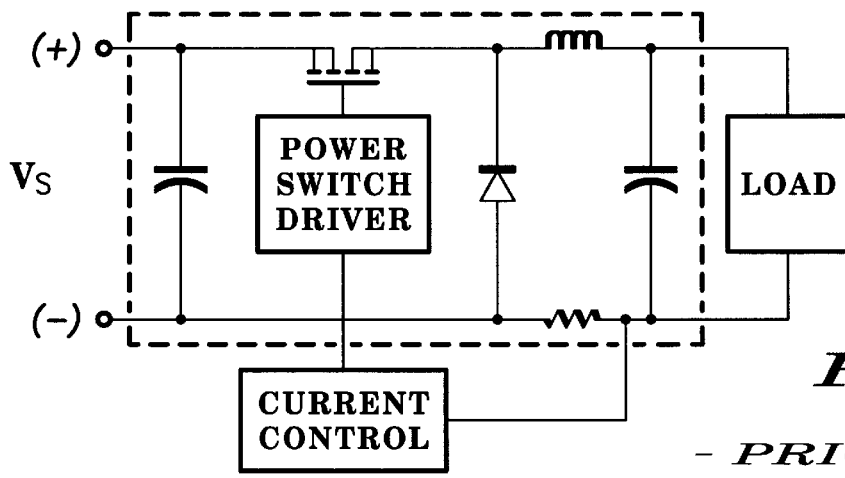
FIG. 1 is a schematic diagram of a power converter and control circuit in accordance with the prior art.

While the specification concludes with claims defining the features of the invention that are regarded as novel, it is believed that the invention will be better understood from a consideration of the following description in conjunction with the drawing figures, in which like reference numerals are carried forward.

An appreciation of the invention can be gained by a brief examination of the prior art. Referring now to FIG. 1, there is shown a schematic diagram 100 of a power converter circuit 102 and control circuit 104 in accordance with the prior art. Briefly, a source voltage Vs 106 is applied to the power converter circuit, and filtered by an input capacitor 108. A power switch 110 permits or interrupts electric current, or simply current, from the source. When the switch is closed (conducting), current flows through the switch, when the switch is open, no current flows through the switch. The power converter shown has a buck topology, and thus it is required that the source voltage be higher than the output voltage of the power converter. When the switch is closed, the source voltage level is apparent across a free wheel diode 112, which will be reverse biased. Load current will flow in the direction of arrow 113 through an inductor 114, a load 116, and a means for providing a current sense signal on line 117, such as a current sense resistor 118. Typically an output capacitor 120 is used to reduce the output voltage ripple. After the power switch has been closed one cycle, and current allowed to flow through the inductor, energy is stored in the magnetic field of the inductor. Upon opening the switch, the voltage across the inductor will reverse polarity, causing the free wheel diode to become forward biased, and conduct the load current.

The current sense signal is fed to control circuit 104 which compares it with a reference voltage level. The control circuit generates a pulse width modulation (PWM) signal on line 122, which operates the power switch directly, or operates a power switch driver 124, which operates the power switch. The PWM signal causes the power switch not only to turn on and off, but to do so at a selectable duty cycle. The switching frequency of a typical PWM controlled buck regulator such as that shown is in the range of 20 KHz to 400 KHz. The timing involved in controlling the duty cycle at such frequencies is beyond the practical limit of an inexpensive microprocessor for use in, for example, a battery charger.

Figure 2:
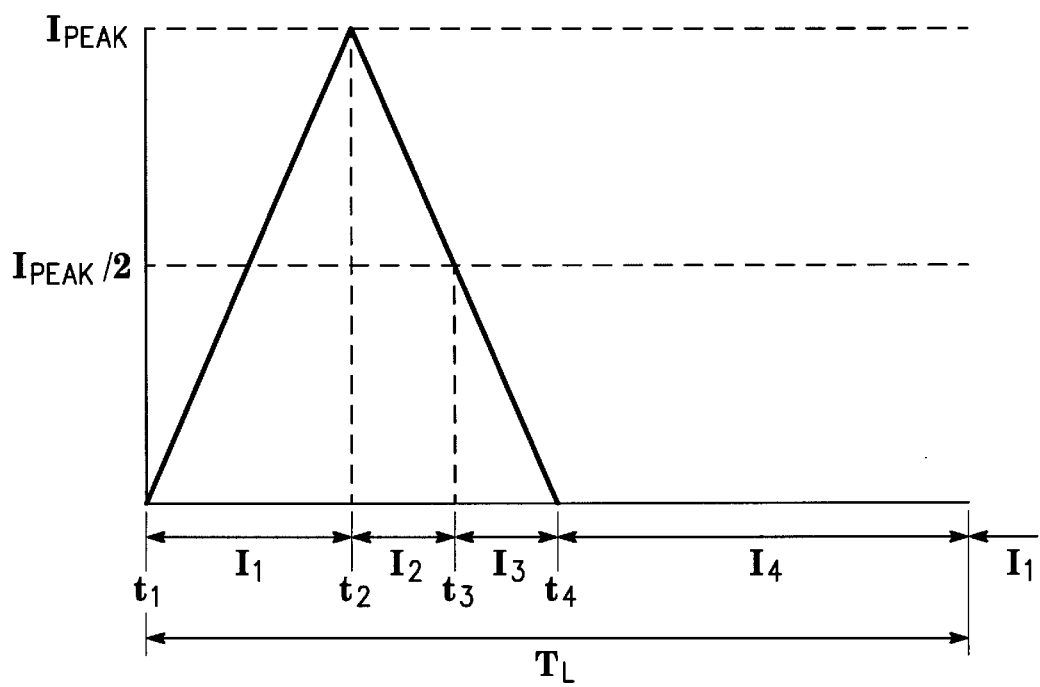
FIG. 2 shows a graph of load current vs. time for a power converter and control circuit in accordance with a first method embodiment of the invention.
Figure 3:
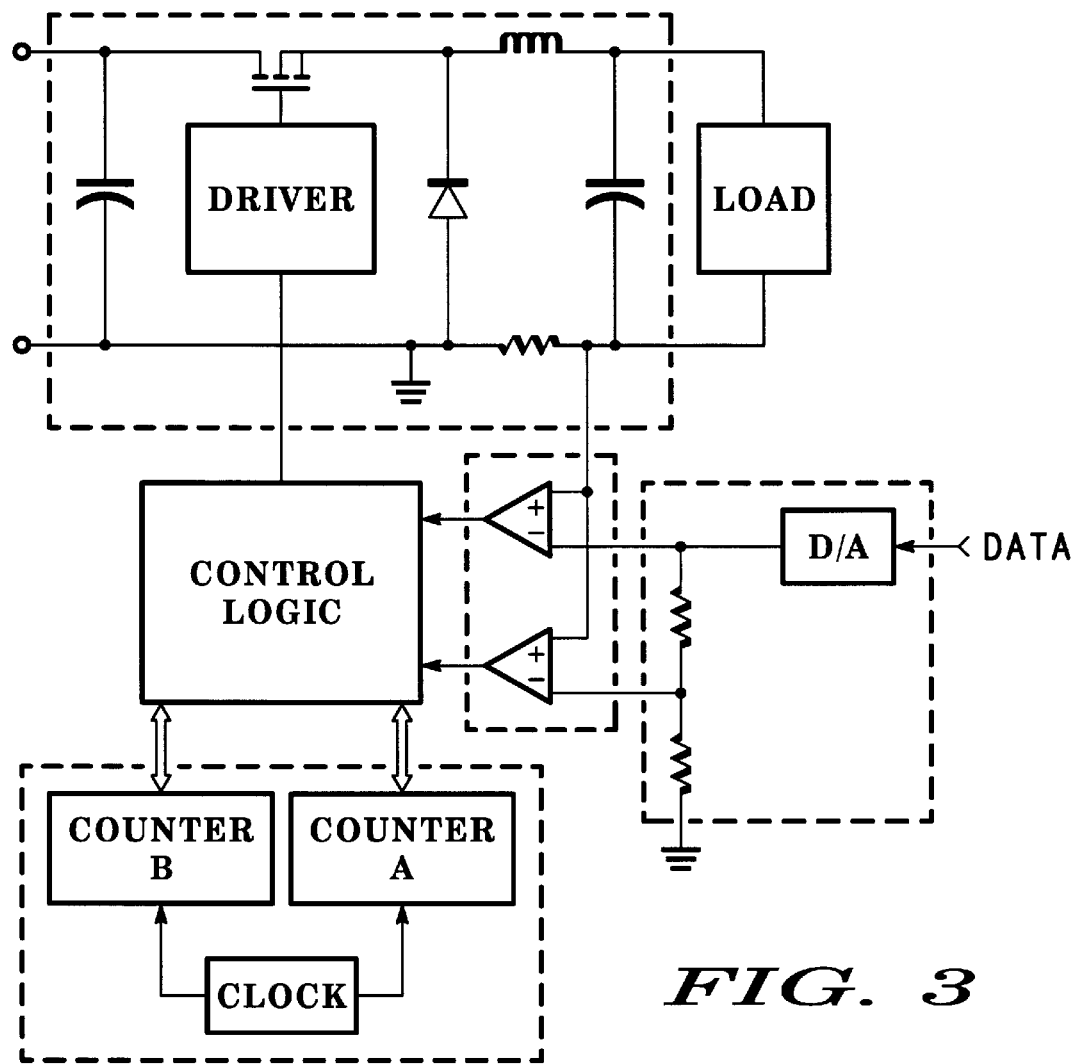
FIG. 3 shows a schematic diagram of a power converter control circuit in accordance with a first apparatus embodiment of the invention.

The invention obviates the need for the complexity and precision required to carry out PWM control in certain applications by controlling the load current in a less fastidious manner. In certain application, such as, for example, battery charging, it is not necessary to control the load current within a very narrow range, as is the case with current regulated PWM converters. Instead, the current may be permitted broader variance, so long as the average current meets a prescribed level. Referring now to FIGS. 2 and 3, there is shown a graph 200 of load current 202 vs. time 204 for a power converter and control circuit in accordance with a first method embodiment of the invention, and a schematic diagram of a power converter control circuit 300 in accordance with a first apparatus embodiment of the invention, respectively. The common elements of the power converter circuit 102 are carried over from FIG. 1. It is assumed throughout this discussion that the source voltage 106 and the output voltage, apparent across the load 116, and the construction of the inductor are such that when the power switch is closed, the current increases substantially linearly, and when the power switch opens, the current through the inductor decreases linearly.

A control circuit is provided, as illustrated in FIG. 3, for carrying out the method represented by the graph of FIG. 2. The control circuit is used for digitally controlling the load current level of the power converter circuit, and comprises a reference circuit 302, an analog comparator circuit 304, a control logic circuit 306, and a counter circuit 308. The reference circuit is for providing a first reference voltage level corresponding to a first preselected load current level, and a second reference voltage level corresponding to a second preselected load current level, and has a digital input 310 for receiving a digital word. The analog comparator circuit is for comparing the first reference voltage and the second reference voltage with the current sense signal on line 117, and provides a first digital signal when the load current level is above the first preselected load current level, and a second digital signal when the load current level is below the second preselected load current level. The control logic circuit 306 is responsive to the first and second digital signals provided by the analog comparator circuit, and controls the power switch according to a preselected mode, as will be described hereinbelow. The control logic circuit may be, for example, a programmable gate array (PGA), as is well known in the art, designed to operate as described herein. The counter circuit 308 comprises a first counter 312 and a second counter 314. The first counter and the second counter are each operably coupled to the control logic circuit, and are reversible up/down counters. By operably coupled, it is meant that the count value of the counter is indicated to the control logic circuit, and the count direction, either up, down, or hold, is controlled by the logic circuit. The counter circuit also comprises a clock signal generator 316 for providing a clock signal to the first and second counters.

In the embodiment depicted in FIG. 3, the reference circuit comprises a digital to analog converter (D/A) 318, having an output 320 for providing an output voltage level on a line proportional to the value of the digital word present at the data input 310. In the circuit shown in FIG. 3, the output of the D/A is the first reference voltage level. The reference circuit of this embodiment further comprises a resistor divider, including a first resistor 322 connected in series with a second resistor 324, coupled to the output of the D/A for providing the second reference voltage level at node 326. The analog comparator circuit comprises a first analog comparator 325, for comparing the current sense signal (117) with the first reference voltage level and providing the first digital signal to the control logic circuit at its output 329, and a second analog comparator 327 for comparing the current sense signal with the second reference voltage level and providing the second digital signal to the control logic circuit at its output 330.

The circuit functions by first providing a digital word to the reference circuit, then closing the power switch 110 at a time t1 (206). The control logic circuit 306 asserts an appropriate logic level on the control line 328 to open or close the power switch as necessary. At the time t1, the control logic circuit causes the first counter 312 to begin counting up from a first initial value at the clock rate of the clock rate generator. After time t1, and before a time t2 (208), is an interval I1 (209). During interval I1, the output of the first analog comparator is at a first logic level. While the load current is below the first preselected load current level 210 (Ipeak), the output of the first analog comparator remains at the first logic level. At time t2, the load current level reaches a first preselected load current level, and the output of the first analog comparator inverts, thus providing the first digital signal. Also, at time t2, the control logic responds by opening the power switch 110, and causing the second counter to begin counting up from a second initial value at the clock rate of the clock signal generator. At the time t3 (212), concluding a second interval I2 (211), the load current reaches the second preselected level 214, which may be, as in this particular embodiment, one half of the first preselected load current level. At time t3, the output of the second analog comparator inverts, thus providing the second digital signal to the control logic circuit. The control logic circuit responds by causing the second counter to reverse the direction of its count. At a time t4 (216). completing a third interval I3 (218), the second counter reaches the second initial value. The control logic circuit responds by reversing the direction of the first counter. Since the inductor is chosen such that the load current decreases linearly after the power switch is opened, and the second preselected load current level is one half the level of the first preselected load current level, it can be inferred that the load current at time t4 is substantially zero. By simple geometry it can be determined that between time t1 and time t4, the average load current provided to the load is one half of the first preselected load current level. At the end of a fourth interval I4 (220), the first counter reaches the first initial value. Because of the linearity of the load current throughout the first three intervals, the fourth interval is of equal duration of the sum of the first three interval. At the end of the fourth interval, the process repeats again. Thus, the average current delivered over one cycle Tc (222) will be ¼ of the first preselected current level.

Thus, the invention differs from conventional PWM control. In PWM control, the current level is adjusted by adjusting the duty cycle of the PWM pulse train. Conversely, according to the invention, an average current level may be provided by setting the first preselected load current level to a value four times greater than the desired average load current. The setting of the peak current is done by writing a digital value or word to the reference circuit, which may be performed by, for example, a microprocessor supervising a battery charging regime.

In FIG. 4, a table 400 summarizes the operation of the control circuit described thus far. During intervals I1, I2, and I3, a non zero load current flows during a conduction interval 402. During interval I4, no load current flows through the load, and is termed a non-conduction interval 404. During interval I1, it is the switch that conducts current 406. During intervals I2 and I3, it is the diode that conducts the decreasing load current 408, and during interval I4, no load current flows 410. While the switch is conducting in I1, the higher source voltage is applied to the inductor, and the inductor current goes from zero to the peak current level of the first preselected load current level 412. In I2, the switch is opened and the inductor current drops from the peak current level to one half of the peak current level 414, and during I3 the current drops from one half the peak to zero 416, where it remains though I4 418. During I1–I3, the first counter is counting up 420, and counts down during I4 422. The second counter is idle during I1 424, counting up during I2 426, counting down during I3 428, and again held idle during I4 430.

Figure 5:
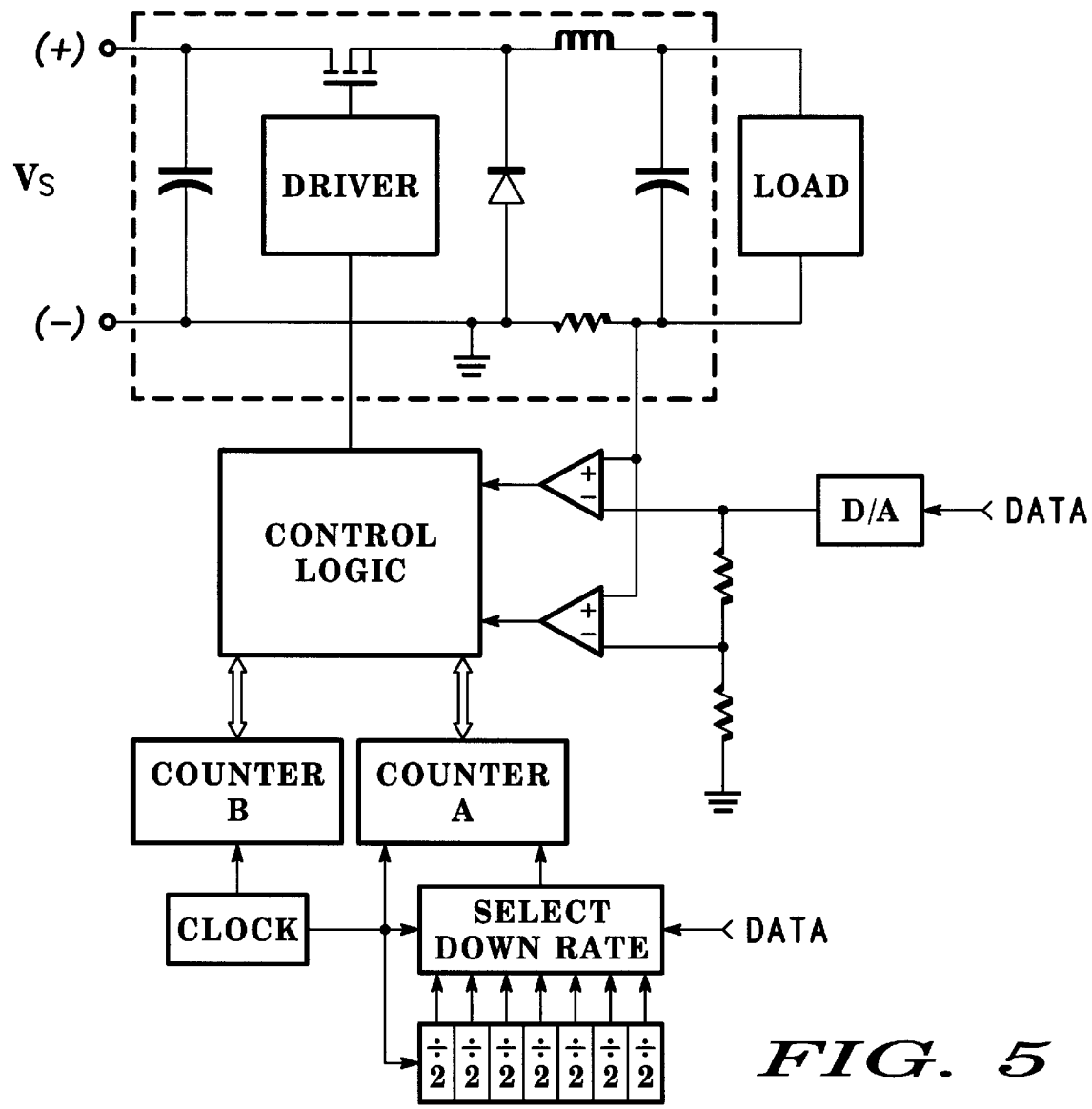
FIG. 5 shows a schematic diagram of power converter control circuit in accordance with a second apparatus embodiment of the invention.

By a simple addition of some common logic elements, the range of average load current can be extended. Referring now to FIG. 5, there is shown a schematic diagram of a power converter control circuit 500 in accordance with a second apparatus embodiment of the invention. In this second apparatus embodiment, the counter circuit further comprises a clock divider 502, coupled to the clock signal generator, for dividing the clock signal down to a lower rate signal, and a rate selector 504, coupled to the clock divider, for selecting a lower rate signal from the clock divider and providing the lower rate signal to a down clock input 506 of the first counter. Thus, the interval I4 can be increased by factors of 2 by decreasing the rate at which the first counter counts down. So, for example, if the down count rate is selected to be one half the clock signal rate, the non-conduction interval I4 will be twice as long as the conduction intervals I1–I3, resulting in a 50% increase of the cycle. Thus the average current will be one half of the peak current for ⅓ of the cycle, or ⅙ of the peak current, the first preselected load current level. The next step would be ⅒ of the peak current. The average current delivered to the load can thus be expressed as Iaverage=Ipeak[1/(2N+2)], where N is 2, 4, 8, 16 . . . and so on. The down count rate is selectable by providing, for example, a 3 bit word to the rate selector. Using a selectable down count rate as described, the usable dynamic range of the power converter circuit can easily be extended to ¹⁄₅₀₀ of the maximum practical average load current.

Figure 6:
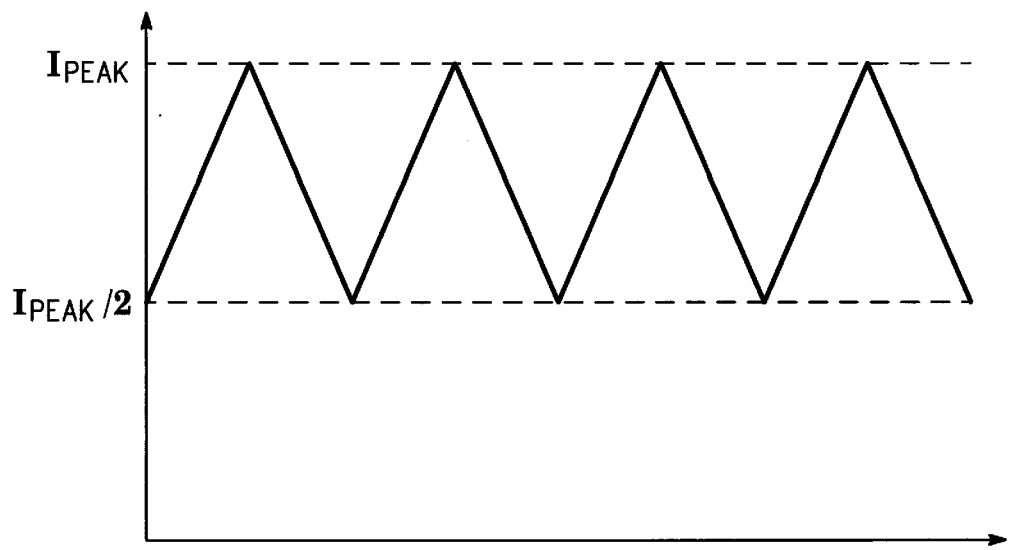
FIG. 6 shows a graph of load current vs. time for a power converter and control circuit in accordance with a second method embodiment of the invention.
Figure 7:
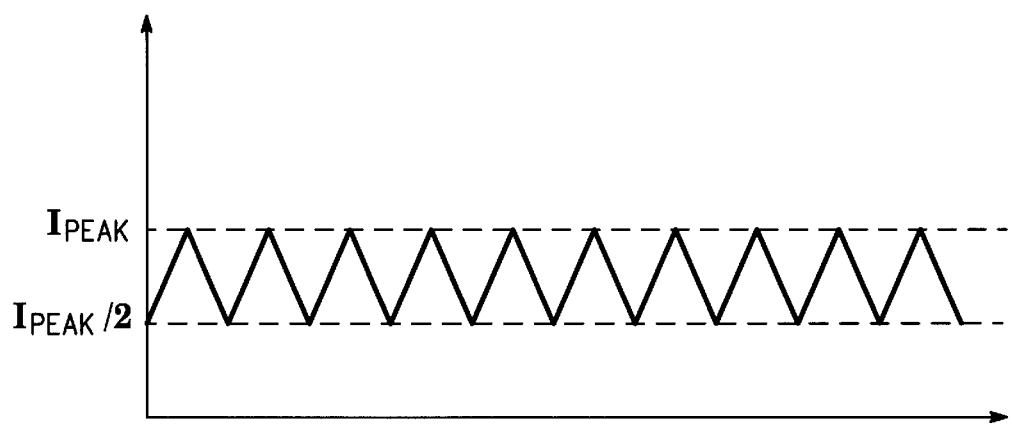
FIG. 7 shows a variation of the second method embodiment of the invention.

Thus far the mode of operation discussed has been what is known as a discontinuous mode of conduction. Since the peak to average ratio is, at best, 4 to 1, at higher average currents, the peak current becomes so high as to require larger than desired components in the power converter circuit, principally the power switch, inductor, and free wheel diode. Conventional power converters typically operate with a range of peak to average current of 1.5-1 to 1.2-1. To overcome this disadvantage, the control circuit may be controlled such that the power converter operates in a continuous conduction mode, as illustrated in FIGS. 6 and 7, a graph 600 of load current vs. time for a power converter and control circuit in accordance with a second method embodiment of the invention, and a graph 700 showing a variation of the second method embodiment of the invention, respectively. To achieve continuous conduction, the power converter starts up as in the discontinuous mode, but rather than letting the load current drop to zero upon reaching the second preselected load current level after opening the power switch, the control logic circuit, upon detecting the second digital signal, closes the power switch. According to the circuits shown in FIGS. 3 and 5, the second preselected load current level is one half of the first preselected load current level. The average current will therefore be ¾ of the first preselected load current level, the peak current. The practical range of average current in the continuous mode is about 4 to 1. That is, normalizing the maximum load current for which the power converter and control circuit are designed to 1, the lowest practical level of average load current is about ¼ of the maximum. This limitation occurs because the rate at which the load current changes remains constant, and at lower peak current level, the rate of switching increases proportionally. It is contemplated that higher speed logic and comparators may be used, but for low cost applications, the practical range is limited. However, as the average load current is ¾ of the peak current, there is a peak to average load current ratio of 1.33 to 1, which is in accordance with conventional converter performance.

Figure 8:
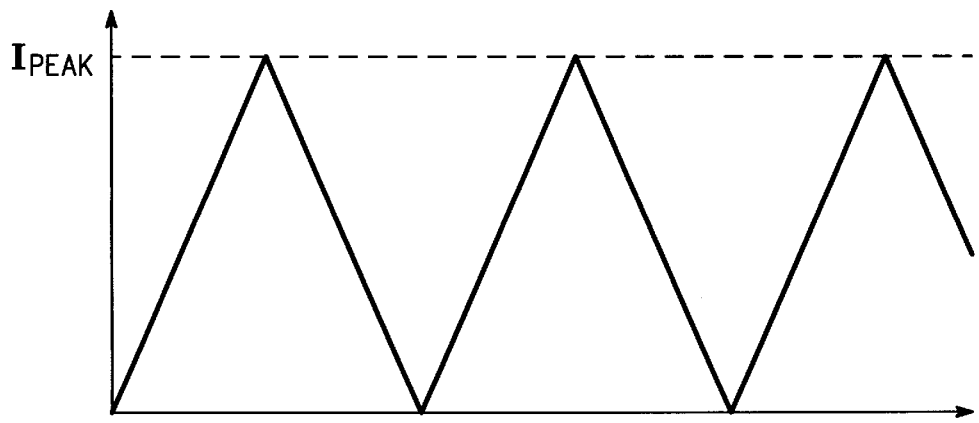
FIG. 8 shows a graph of load current vs. time for a power converter and control circuit in accordance with a third method embodiment of the invention.

A third mode of operation can be achieved by permitting the load current to reach zero, and immediately closing the power switch, as is represented in FIG. 8, a graph 800 of load current vs. time for a power converter and control circuit in accordance with a third method embodiment of the invention. This third method of operation is referred to as a critical conduction mode. For this mode of operation, the control logic circuit uses the first and second digital signals and one of the counters. Initially, the control logic circuit closes the power switch, causing the load current to increase from zero to the first preselected load current level, Ipeak, at which time the first digital signal occurs. Then the control logic circuit enables a counter to start counting. When the second digital signal is received, the control logic reverses the direction of the counter until it reaches its initial value, at which time the load current will be substantially zero, and the cycle begins again.

In a practical control circuit design, the control circuit should be able to perform any one the modes described, as well as an off mode. In practicing the invention, the different modes are preferable over different load current ranges. The following examples serve as a guideline for operation of the control circuit as shown in FIG. 5. Assume that the maximum desired average current Iload is normalized to 1.000 ampere, all units are in normalized amperes. For each case the value of the digital word provided to the reference circuit may be varied to correspond with the desired first and second preselected load current levels to achieve the desired average load current.

Case 1:

0.400<Iload=<1.000

For this range of Iload, continuous mode is selected;

the value of N for the down rate selector is not relevant;

the peak current is 4⁄3 Iload; and the range of Ipeak is from 0.533 to 1.333 amps.

Case 2:

0.150<Iload=<0.400

For this range of Iload, critical conduction mode is selected;

the value of N is not relevant;

the peak current is 2*Iload; and the range of Ipeak is from 0.300 to 0.800.

Case 3:

0.100<Iload=<0.150

For this range of Iload, discontinuous conduction is selected;

the value of N is one (no rate division);

the peak current is 4*Iload; and the range of Ipeak is 0.400<Ipeak=<0.600 amps.

Below 0.100 amps the mode continues to be selected as the discontinuous mode, with the value of N being selected appropriately.

Figure 9:
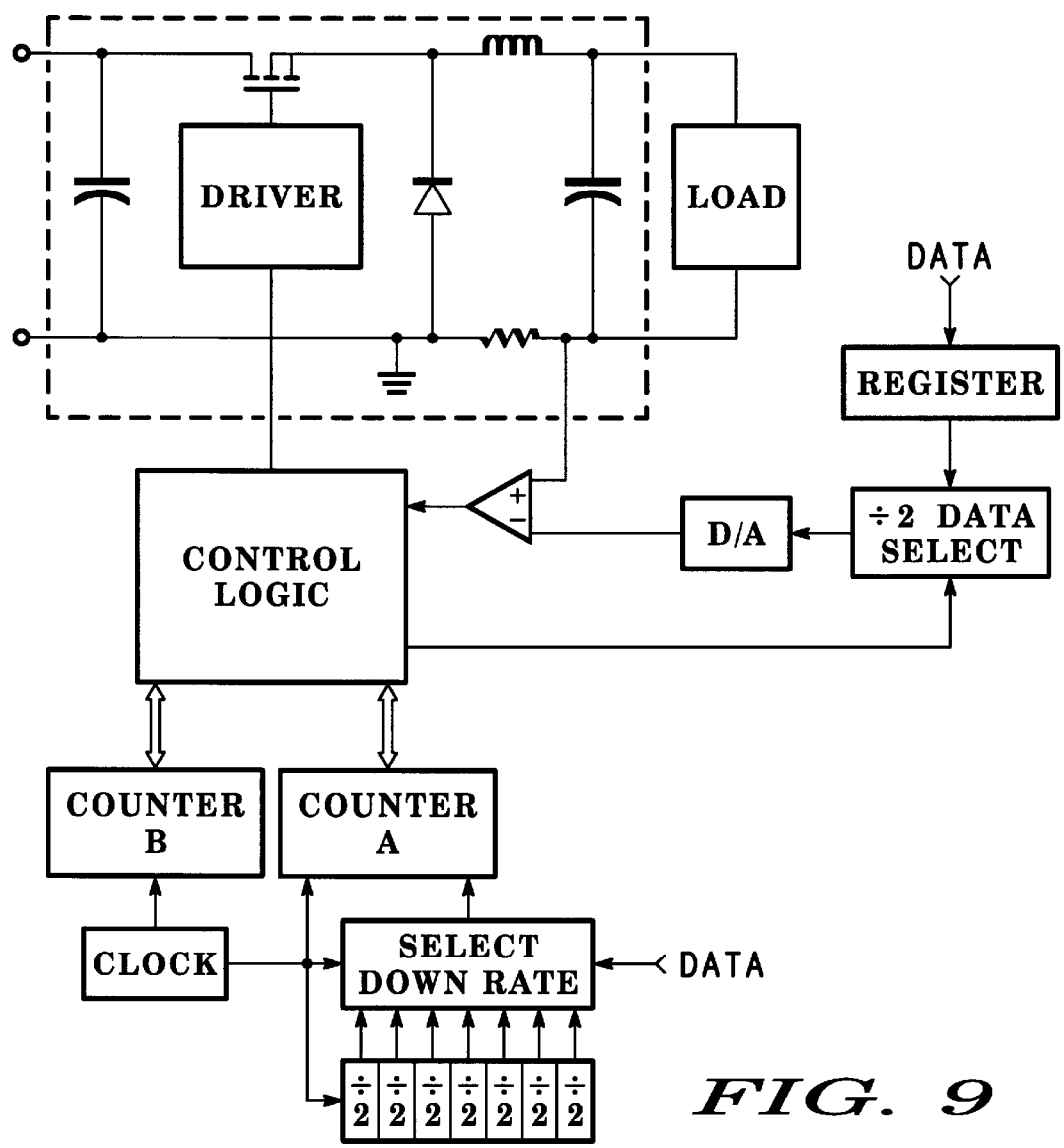
FIG. 9 shows a schematic diagram of a power converter control circuit in accordance with a third apparatus embodiment of the invention.

Referring now to FIG. 9, there is shown a schematic diagram of power converter control circuit 900 in accordance with a third apparatus embodiment of the invention. In this third apparatus embodiment, the analog comparator circuit 304 has been reduced to a single analog comparator 325, having a first input 905 coupled to the current sense signal 117. This is accomplished by also modifying the reference circuit 302. The reference circuit of FIG. 9 comprises a register 902 for receiving the data word at the digital input 310. The register latches the digital word until it is changed by supervisory circuit such as, for example, a microprocessor. The register is coupled to a data selector 904, which is coupled to the D/A 318. The data selector is operably coupled to the control logic circuit by an enable line 906. To provide the first reference voltage level to the second input 907 of the analog comparator circuit, the digital word stored in the register 902 is stored in the data selector and fed to the D/A from a digital output 903. The D/A produces the first reference voltage level at its output 320, which is directly compared to the current sense signal. Once the load current reaches the first preselected load current level, the output 329 of the analog comparator 325 inverts, thus providing the first digital signal. Upon detecting the first digital signal, the control logic circuit 306 opens the power switch 110. At the same time, the control logic circuit enables the data selector 904, which shifts the digital word down one bit, effectively a digital divide by two. Thus, the second reference voltage is produced by the D/A. The logic circuit can be designed to ignore the output of the analog comparator for a brief period of time while the change of reference voltage levels occurs. When the load current level reaches the second preselected load current level, the analog comparator's output will again invert, thereby providing the second digital signal. The control logic will respond appropriately for the mode in which it is presently operating. Given that there are four modes of operation, off, continuous, critical, and discontinuous, it is contemplated that the control logic circuit 306 can be made mode selectable by providing at least two logic level inputs 908 and 910. With two inputs, any of the four modes can be selected. It is also contemplated that a dedicated input for each mode may be provided, for a total of four inputs, and the desired mode may be selected by asserting the appropriate logic signal on the input corresponding to the desired mode.

Figure 10:
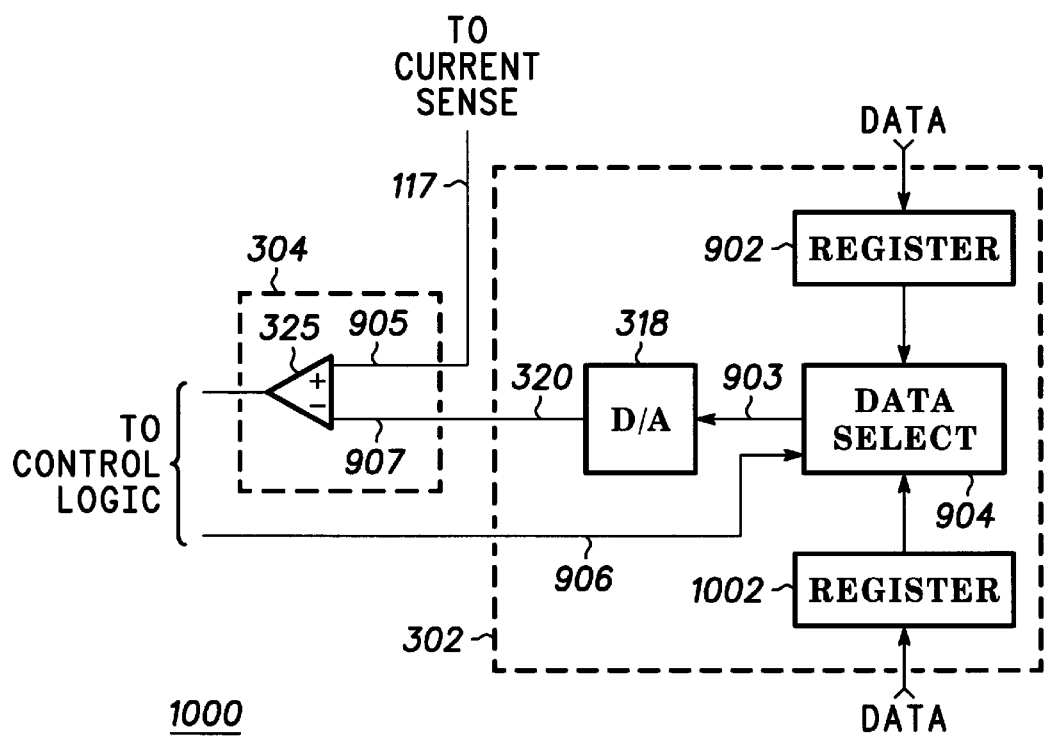
FIG. 10 shows a schematic diagram of a reference circuit in accordance with a fourth apparatus embodiment of the invention.

Referring now to FIG. 10, there is shown a schematic diagram 1000 of reference circuit in accordance with a fourth apparatus embodiment of the invention. Here the reference circuit is similar to that shown in FIG. 9, but in FIG. 10 the register is a first register, the reference circuit comprises a second register 1002 for receiving a second digital word corresponding to the second preselected load current level. The data selector, rather than divide the first digital word down, simply provides either the first digital word stored in the first register to the D/A, or the second digital word stored in the second register 1002, depending on the state of the enable line 906. The advantage of this arrangement is that the second preselected load current is no longer fixed at one half the value of the first preselected load current. This can be an advantage for operation in the continuous conduction mode. As discussed in reference to FIGS. 6 and 7, the practical range of the peak current, the first preselected load current level, is about 4 to 1. Meaning that the difference between the peak and half peak current levels is 1/8 of the maximum peak current level. Thus, it is contemplated that the second digital word can be selected such that the second preselected load current level is always 1/8 of the maximum load current level below the first preselected load current level. This could significantly reduce the burden on the power components of the power converter circuit.

Figure 11:
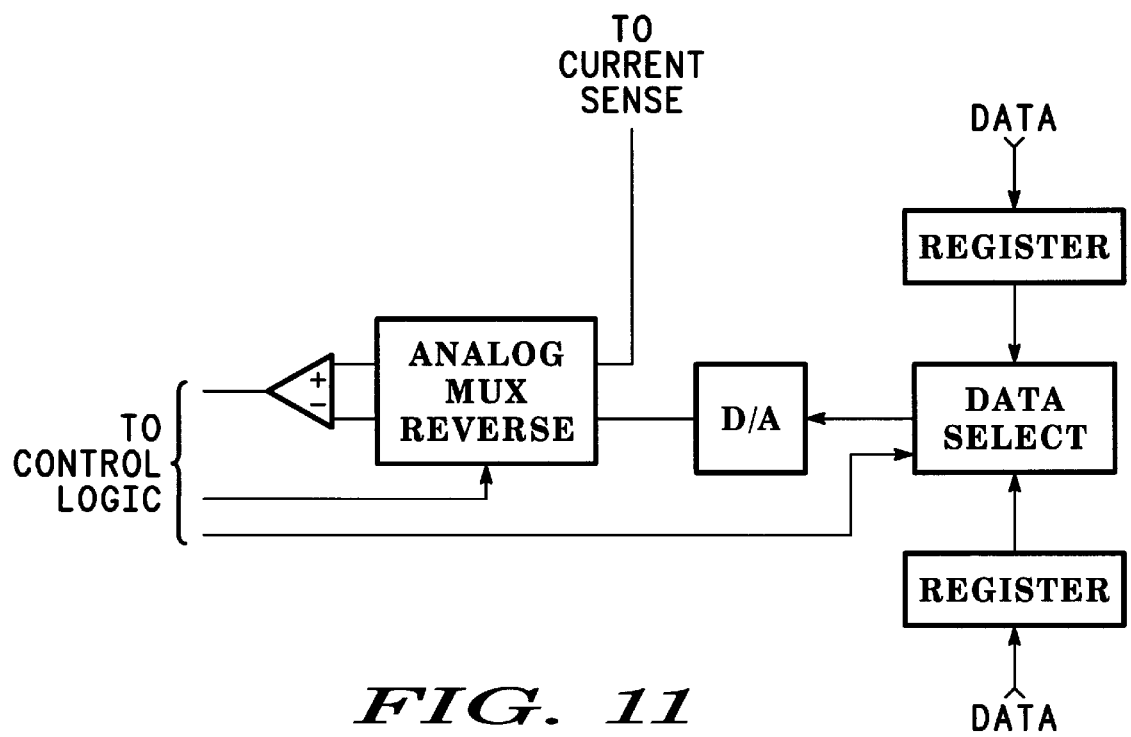
FIG. 11 shows a schematic diagram of an analog comparator circuit in accordance with a fifth apparatus embodiment of the invention.

Referring now to FIG. 11, there is shown a a schematic diagram 1100 of an analog comparator circuit 304 in accordance with a fifth apparatus embodiment of the invention. Because an analog comparator may have errors as a result of offset voltages at its inputs, the average load current may not be precise enough for some application, particularly when the load current levels become small, such as when providing a trickle charge current to a battery. To eliminate errors introduced by the offset voltages of the analog comparator, an analog multiplexer 1102 (MUX) is connected to the first and second inputs, 905 and 907, respectively, and to the output 320 of the D/A and the current sense signal 117. In a first state, the MUX connect the current sense signal to the first input 905, and the output 320 of the D/A the second input 907. The control logic circuit (not shown here) is coupled to the MUX by a MUX enable line 1104. Upon enabling the MUX, the input connections of the analog comparator are reversed, and likewise, the digital signal output of the analog comparator becomes inverted. To cancel out errors due to offset voltage, the MUX is enabled every other cycle of operation. The control logic circuit is designed to invert the output of the analog comparator whenever the MUX is enabled. Although shown in conjunction with the dual register embodiment of the reference circuit, the MUX may be used in any of the previously discussed embodiments.

Figure 12:
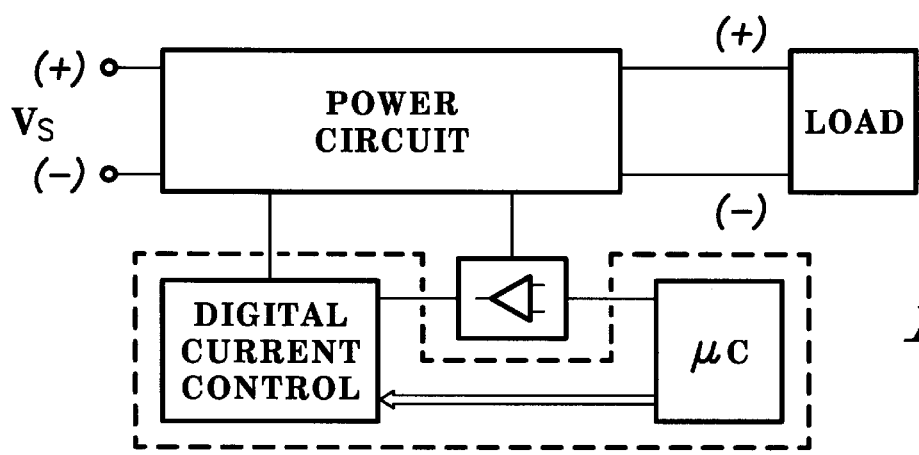
FIG. 12 shows a block diagram of power converter control circuit in accordance with a sixth apparatus embodiment of the invention.

Referring now to FIG. 12, there is shown a block diagram 1200 of power converter control circuit in accordance with a sixth apparatus embodiment of the invention. In this embodiment a microprocessor 1202 is used for providing the digital word for the reference circuit 302, and selecting the mode of the control logic. The reference circuit may be part of the microprocessor, as many microprocessors currently manufactured comprise a D/A. It is also contemplated that the microprocessor, reference circuit, analog comparator circuit 304, analog multiplexer 1102, control logic circuit 306, and counter circuit 308 are disposed on a common integrated circuit. In other words, they are packaged together on a single chip.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A control circuit for digitally controlling a load current level of a power converter circuit, the power converter circuit having a power switch and a means for providing a current sense signal indicative of the load current, the power switch having an open state and a closed state, the control circuit comprising:

a reference circuit for providing a first reference voltage level corresponding to a first preselected load current level, and for providing a second reference voltage level corresponding to a second preselected load current level, the reference circuit having a digital input for receiving a digital word;

an analog comparator circuit for comparing the first reference voltage and the second reference voltage with the current sense signal and providing a first digital signal when the load current level is above the first preselected load current level, and a second digital signal when the load current level is below the second preselected load current level;

a control logic circuit, responsive to the first and second digital signals, for controlling the power switch according to a mode, the mode being selectable to one of a plurality of modes; and a counter circuit comprising a first counter and a second counter, the first counter and the second counter each operably coupled to the control logic circuit, and each being reversible up/down counters, the counter circuit further comprising a clock signal generator for providing a clock signal to the first counter and the second counter.

2. A control circuit for digitally controlling a load current level of a power converter circuit as defined in claim 1, wherein the second reference voltage level is one half of the first reference voltage level.

3. A control circuit for digitally controlling a load current level of a power converter circuit as defined in claim 1, wherein the reference circuit comprises:

a digital to analog (D/A) converter having an output for providing an output voltage level proportional to the value of the digital word, and wherein the output voltage of the D/A being the first reference voltage level; and a resistor divider coupled to the output of the D/A for providing the second reference voltage level.

4. A control circuit for digitally controlling a load current level of a power converter circuit as defined in claim 1, wherein the reference circuit comprises:

a register for receiving the digital word;

a data selector, coupled to the register, for providing a digital output, the digital output selectable between the digital word and the digital word shifted down one bit, the output being selectable by the control logic circuit; and a digital to analog converter (D/A) coupled to the data selector for converting the digital output to an output voltage level;

wherein the output voltage level of the D/A is the first reference voltage level when the digital output of the data selector is selected to be the digital word; and wherein the output voltage level of the D/A is the second reference voltage level when the digital output of the data selector is selected to be the digital word shifted down one bit.

5. A control circuit for digitally controlling a load current level of a power converter circuit as defined in claim 1, wherein the digital word is a first digital word, the reference circuit comprises:

a first register for receiving the first digital word;

a second register for receiving a second digital word;

a data selector, coupled to the first and second registers, for providing a digital output, the digital output selectable between the first digital word and the second digital word; and a digital to analog converter (D/A), coupled to the data selector, for converting the digital output to an output voltage level;

wherein the output voltage level of the D/A is the first reference voltage level when the digital output of the data selector is selected to be the first digital word; and wherein the output voltage level of the D/A is the second reference voltage level when the digital output of the data selector is selected to be the second digital word.

6. A control circuit for digitally controlling a load current level of a power converter circuit as defined in claim 1, wherein the analog comparator circuit comprises:

a first analog comparator for comparing the current sense signal with the first reference voltage level and providing the first digital signal; and a second analog comparator for comparing the current sense signal with the second reference voltage level and providing the second digital signal.

7. A control circuit for digitally controlling a load current level of a power converter circuit as defined in claim 1, wherein:

the reference circuit comprises a digital to analog converter (D/A) having an output, the reference circuit having a state of operation, the state of operation being selectable by the control logic circuit between a first state for providing the first reference voltage level at the output of the D/A and a second state for providing the second reference voltage level at the output of the D/A;

the comparator circuit comprises an analog comparator having a first input coupled to the current sense signal and a second input coupled to the output of the D/A, the analog comparator providing the first digital signal when the reference circuit is operated in the first state, and providing the second digital signal when the reference circuit is operated in the second state.

8. A control circuit for digitally controlling a load current level of a power converter circuit as defined in claim 7, wherein the analog comparator circuit further comprises an analog multiplexer, operably coupled to the control logic circuit, and coupled to the first and second inputs of the analog comparator for reversing the current sense signal and the output of the D/A in response to a reverse signal from the control logic circuit.

9. A control circuit for digitally controlling a load current level of a power converter circuit as defined in claim 1, wherein the counter circuit further comprises:

a clock divider, coupled to the clock signal generator, for dividing the clock signal down to a lower rate signal; and a rate selector, coupled to the clock divider, for selecting the lower rate signal from the clock divider and providing the lower rate signal to a down clock input of the first counter.

10. A control circuit for digitally controlling a load current level of a power converter circuit as defined in claim 1, wherein the control logic circuit is selectable to an off mode.

11. A control circuit for digitally controlling a load current level of a power converter circuit as defined in claim 1, wherein the control logic circuit is selectable to an discontinuous conduction mode.

12. A control circuit for digitally controlling a load current level of a power converter circuit as defined in claim 1, wherein the control logic circuit is selectable to an critical conduction mode.

13. A control circuit for digitally controlling a load current level of a power converter circuit as defined in claim 1, wherein the control logic circuit is selectable to an continuous conduction mode.

14. A control circuit for digitally controlling a load current level of a power converter circuit as defined in claim 1, further comprising a microprocessor for providing the digital word for the reference circuit and selecting the mode of the control logic circuit.

15. A control circuit for digitally controlling a load current level of a power converter circuit as defined in claim 14, wherein the microprocessor, reference circuit, analog comparator circuit, control logic circuit and counter circuit are disposed on a common integrated circuit.

16. A method of controlling a load current of a power converter circuit,
   a) providing a digital word to a reference circuit, the digital word having a value corresponding to a first preselected load current level;
   b) closing a power switch of the power converter circuit at a time t1, allowing current to flow through the power switch;
   c) counting up at a first clock rate, performed by a first counter and beginning at the time t1, the counting beginning at a first counter initial value;
   d) sensing the load current reaching the first preselected load current level at a time t2;
   e) opening the power switch of the power converter such that no current flows through the power switch at the time t2;
   f) counting up at the first clock rate, performed by a second counter and beginning at the time t2, the counting beginning at a second counter initial value;
   g) sensing the load current reaching a second preselected load current level at a time t3, the second preselected load current level lower than the first preselected load current level;
   h) counting down at the first clock rate, performed by the second counter and beginning at the time t3, the second counter reaching the second initial value at a time t4; and
   i) counting down, performed by the first counter and beginning at the time t4.

17. A method of controlling a load current of a power converter circuit as defined in claim 16, wherein step b) through step i) are repeated.

18. A method of controlling a load current of a power converter circuit as defined in claim 16, wherein in step i), the first counter counts down at the first clock rate.

19. A method of controlling a load current of a power converter circuit as defined in claim 16, wherein in step i), the first counter counts down at a second clock rate, the second clock rate being lower than the first clock rate.

20. A method of controlling a load current of a power converter circuit as defined in claim 16, wherein in the step of providing, the digital word is a first digital word, and the step of providing further comprises providing a second digital word having a value corresponding to a second preselected load current level.

* * * * *